United States Patent [19]

Masaki et al.

[11] Patent Number: 4,900,890
[45] Date of Patent: Feb. 13, 1990

[54] ELECTRIC DISCHARGE MACHINING METHOD AND APPARATUS FOR MACHINING A MICROSHAFT

[75] Inventors: Takeshi Masaki, Kawasaki; Takeshi Mizutani, Tokyo; Katsutoshi Yonemaochi, Zama; Akemi Tanaka, Kawasaki, all of Japan

[73] Assignee: Matsushita Electric Industrial Co., Ltd., Osaka, Japan

[21] Appl. No.: 239,293

[22] Filed: Sep. 1, 1988

[30] Foreign Application Priority Data

| Sep. 7, 1987 | [JP] | Japan | 62-223479 |
| Oct. 16, 1987 | [JP] | Japan | 62-262046 |
| Oct. 16, 1987 | [JP] | Japan | 62-262047 |
| Oct. 16, 1987 | [JP] | Japan | 62-262059 |
| Mar. 11, 1988 | [JP] | Japan | 63-58737 |
| Mar. 11, 1988 | [JP] | Japan | 63-58738 |
| Jun. 15, 1988 | [JP] | Japan | 63-147462 |

[51] Int. Cl.$^4$ .......................... B23H 1/00; B23H 7/02; B23H 9/14
[52] U.S. Cl. ............................. 219/69.17; 219/69.12
[58] Field of Search ................ 219/69 W, 69 V, 69 M, 219/69 G, 69.12, 69.20, 69.17, 69.16, 69.11, 69.18

[56] References Cited

U.S. PATENT DOCUMENTS

| 4,598,190 | 7/1986 | Balleys | 219/69.12 |
| 4,654,498 | 3/1987 | Sato | 219/69 E |
| 4,725,704 | 2/1988 | Vuichard | 219/69 W |
| 4,771,157 | 9/1988 | Sato et al. | 219/69 E |

FOREIGN PATENT DOCUMENTS

| 3022917 | 4/1981 | Fed. Rep. of Germany . | |
| 56-52133 | 5/1981 | Japan | 219/69 W |
| 120921 | 6/1987 | Japan | 219/69 W |

| 8201148 | 4/1982 | PCT Int'l Appl. . |

OTHER PUBLICATIONS

"Electro-Discharge Machine for Micro-Hole Boring" by Takeo Sato et al.; National Technical Report, vol. 31, No. 5, Oct. 1985, pp. 105-113.

Primary Examiner—A. D. Pellinen
Assistant Examiner—Geoffrey S. Evans
Attorney, Agent, or Firm—Lowe, Price, Leblanc, Becker & Shur

[57] ABSTRACT

An electric discharge machining system of machining a microshaft by electric discharge made between the microshaft and a conductive wire used as a working tool. The microshaft is vertically supported by a bearing to be rotatable about its own axis and movable up and down in directions of the axis by a microshaft driving device and the wire is arranged to travel in a direction of its own axis and to be movable in directions close to and away from the microshaft by a wire driving device, whereby the wire is relatively movable with respect to the microshaft in horizontal and vertical directions. On the electric discharge machine, a control unit controls the microshaft driving device and wire driving device so that the wire is moved up to a predetermined position horizontally away by a first predetermined distance from a first reference point in the horizontal directions that the axis of the wire intersects the axis of the microshaft and the microshaft is moved vertically by a predetermined distance with respect to the wire with the wire travelling in the direction of its own axis and the microshaft being rotated about its own axis. As a result, the microshaft is machined to have a diameter equal to twice the first predetermined distance and the machined portion of the microshaft has a length corresponding to the second predetermined distance.

18 Claims, 9 Drawing Sheets

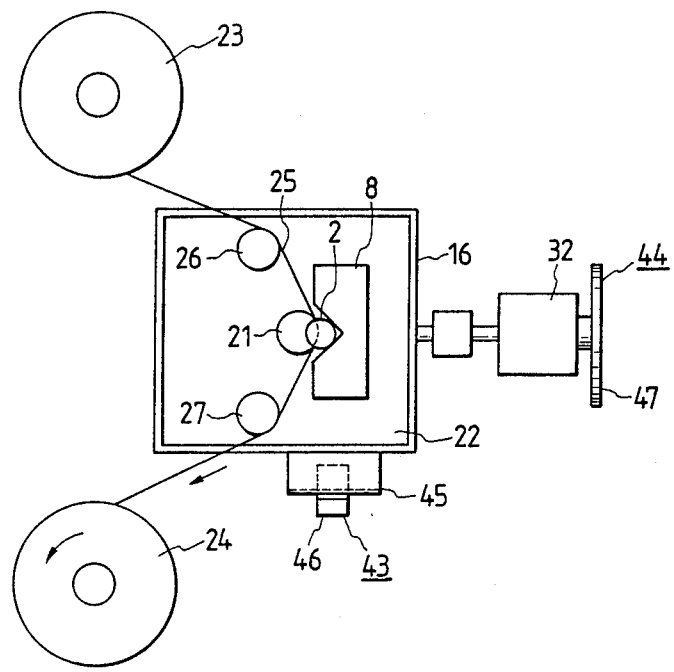
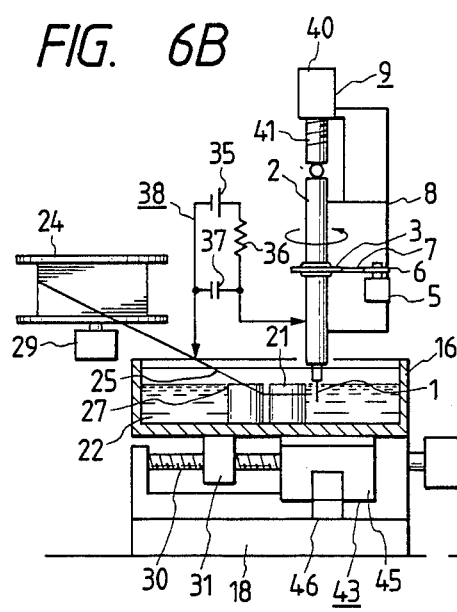
FIG. 6A
FIG. 6B
FIG. 6C

FIG. 10A
FIG. 10B
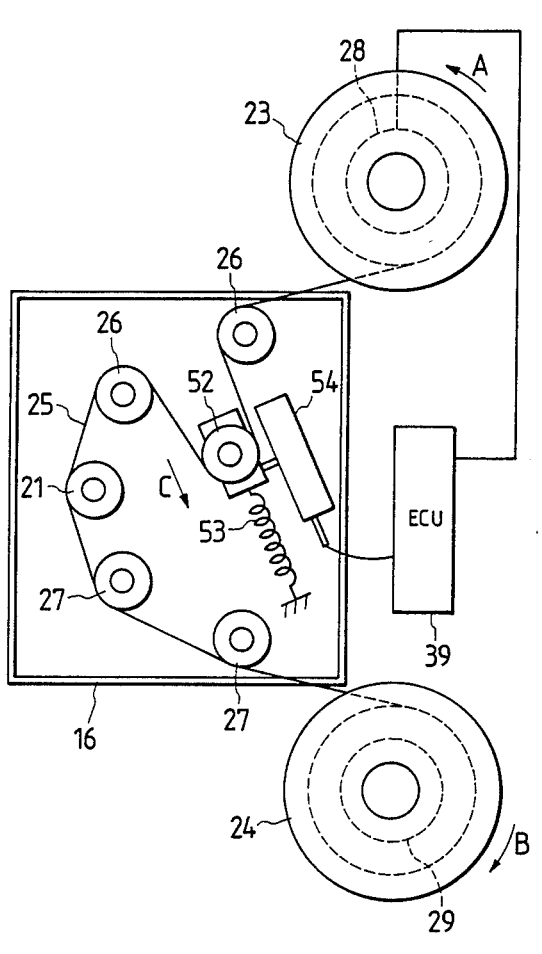
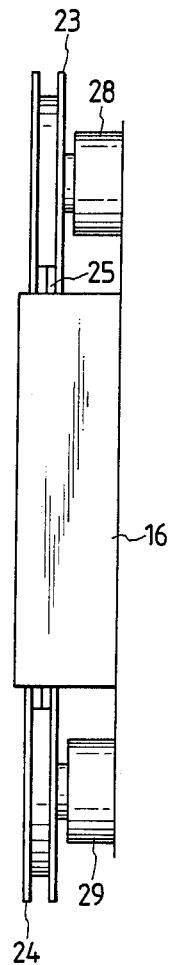

ELECTRIC DISCHARGE MACHINING METHOD AND APPARATUS FOR MACHINING A MICROSHAFT

BACKGROUND OF THE INVENTION

The present invention relates generally to an electric discharge machining method and an apparatus, and more particularly to such a method and apparatus for machining, by means of the electric discharge, a microshaft such as microelectrode employed for forming a microhole such as a nozzle of an ink jet printer and an optical fiber connector.

One prior method of machining a micro or fine shaft through the electric discharge technique is known, as exemplified by description in "National Technical Report" Vol. 31 No. 5 Page 105, in which a microelectrode is electrically discharged with respect to a metallic block so that its diameter is gradually decreased to a desirable value. One important problem in such a conventional electric discharge machining method is, however, to scattering in diameters of the machined microelectrodes due to wearing of the metallic block during the electric discharge process. This results in difficulty being encountered to accurately machine the microelectrodes so as to have the desirable diameter. Furthermore, in the case that the microelectrode is machined so as to have a considerably small diameter, the microelectrode tends to be deflected during the electric discharge process to cause the microelectrode to be finished to a tapered configuration.

SUMMARY OF THE INVENTION

The present invention has been developed in order to avoid the above-described problems inherent to the conventional electric discharge machining technique.

It is therefore an object of the present invention to provide a method and apparatus which is capable of accurately and easily machining a microshaft by means of the electric discharge technique.

In accordance with the present invention, there is provided an electric discharge machining method of machining a microshaft by means of electric discharge made between the microshaft and a conductive wire through an electric discharge circuit, the microshaft being vertically supported by supporting means to be rotatable about its own axis and movable up and down in directions of the axis by means of microshaft driving means and the wire being arranged to travel in a direction of its own axis and to be movable in directions close to and away from the microshaft by means of wire driving means, whereby the wire is relatively movable with respect to the microshaft in horizontal and vertical directions, comprising the steps of: (a) determining a first reference point in the horizontal direction that the axis of the wire intersects the axis of the microshaft; (b) driving the wire driving means so that the wire travels in the direction of its own axis; (c) rotating the microshaft and machining the lower end surface of the microshaft by the wire so that the lower end surface thereof becomes perpendicular to the axis thereof to determine a second reference point in the vertical directions on the basis of the position of the machined end surface thereof; (d) shifting the wire up to a predetermined position away from the first reference point in the horizontal direction by a first predetermined distance; and (e) moving said microshaft with respect to the wire in the vertical directions by a second predetermined distance between the second reference point and a predetermined point with the microshaft being rotated and the wire travelling so that the microshaft is machined to have a diameter substantially equal to twice the first predetermined distance and the machined portion of the microshaft has a length corresponding to the second predetermined distance. Preferably, the method further comprises a step of further moving the microshaft with respect to the wire in the vertical directions without reducing the diameter of the machined portion of the microshaft with the electric discharge being made between the wire and the microshaft after the termination of the machining of the microshaft.

In accordance with the present invention, there is further provided an electric discharge machining apparatus for machining a microshaft by means of electric discharge, comprising: mandrel means for holding the microshaft; bearing means for supporting the mandrel; first drive means for rotating the mandrel means so that the microshaft is rotated about its own axis; second drive means for moving the mandrel and the microshaft so that the microshaft is relatively movable in directions of its own axis with respect to a conductive wire used as means for machining the microshaft; third drive means for moving the wire in a direction of its own axis at a machining position with the wire being guided by wire guiding means; fourth drive means for moving the wire so as to be closed and separated to and from the microshaft; electric discharge circuit means for generating electric discharge between the microshaft and the wire; and control means for controlling he first to fourth drive means and the electric discharge circuit means so that the wire is moved by the fourth drive means so as to be separated by a first predetermined distance from the axis of the microshaft, the microshaft is rotated by the first drive means, the wire is moved in the direction of its own axis by the third drive means, the electric discharge is made by electric discharge circuit means between the wire and microshaft, and the microshaft is moved by the second drive means by a second predetermined distance in the direction of its own axis, whereby the microshaft is machined so as to have a predetermined diameter corresponding to the first predetermined distance and the machined portion of the microshaft has a length corresponding to the second predetermined length.

More specifically, the mandrel holds the microshaft so as to be coaxial therewith and the bearing means has a V-shaped groove formed vertically, the mandrel being supported by the V-shaped groove of the bearing means so that the microshaft is kept vertically, and the wire guiding means is placed on table means and the fourth drive means comprises a screw shaft, nut member engaged with the screw shaft, and stepping motor means coupled to the screw shaft to move the nut member along the screw shaft, the nut member being connected to the table means so that the wire is movable with respect to the microshaft. Furthermore, after the termination of the electric discharge machining of the microshaft, the control means controls the second drive means so that the microshaft is moved in the direction opposite to the direction in which the microshaft has been machined by the electric discharge, and the third drive means comprises a supply bobbin around which the wire is wound and a take-up bobbin for winding the wire supplied through the wire guiding means from the supply bobbin, the supply bobbin being driven in one direction by a first motor and the take-up bobbin being driven in a direction opposite to the driving direction of the supply bobbin by a second motor, the rotational torque of the take-up bobbin being greater than that of the supply bobbin and the wire being wound around the take-up bobbin by the difference between the rotational torques of the supply bobbin and the take-up bobbin.

Preferably, the wire guiding means includes a movable guide which is biased by spring means in one direction to be movable so as to provide a tension force to the wire between the supply bobbin and the take-up bobbin and which is movable against the biasing force of the spring means in a direction opposite to the biasing direction of the spring means so as to reduce the tension force of the wire therebetween. Furthermore, the wire guiding means is arranged so that the wire travels in parallel to a bisector of the triangular cross section of the V-shaped groove of the bearing means, the bisector passing through one of three points of the triangular cross section corresponding to the bottom of the V-shaped groove thereof.

BRIEF DESCRIPTION OF THE DRAWINGS

The object and features of the present invention will become more readily apparent from the following detailed description of the preferred embodiments taken in conjunction with the accompanying drawings in which:

FIGS. 4A, 4B and 4C show an second embodiment of this invention, FIG. 4A being a plan view of a microshaft electric discharge machining apparatus according to the second embodiment, FIG. 4B being an elevational view of the electric discharge machining apparatus partially in section, and FIG. 4C being an enlarged view of a portion of the electric discharge machining apparatus indicated by reference character Vc in FIG. 4B;

FIGS. 6A, 6B and 6C show a third embodiment of this invention, FIG. 6A being a plan view of a microshaft electric discharge machining apparatus of the third embodiment, FIG. 6B being an elevational view of the microshaft electric discharge machining apparatus partially in section, and FIG. 6C being an illustration viewed from the direction indicated by an arrow VIIc in FIG. 6B

FIGS. 10A and 10B show a fifth embodiment of this invention, FIG. 10A being a plan view showing a microshaft electric discharge machining apparatus of the fifth embodiment and FIG. 10B being a side view of the microshaft electric discharge machining apparatus.

DETAILED DESCRIPTION OF THE INVENTION

Figure 1A:
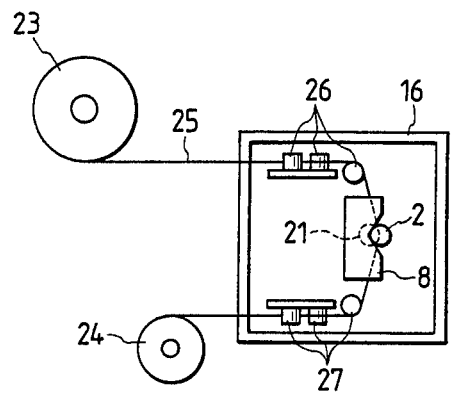
FIGS. 1A and 1B show an electric discharge machining apparatus according to a first embodiment of the present invention, FIG. 1A being a plan view of the electric discharge machining apparatus of the first embodiment and FIG. 1B being an elevational view of the electric discharge machining apparatus partially in section.
Figure 1B:
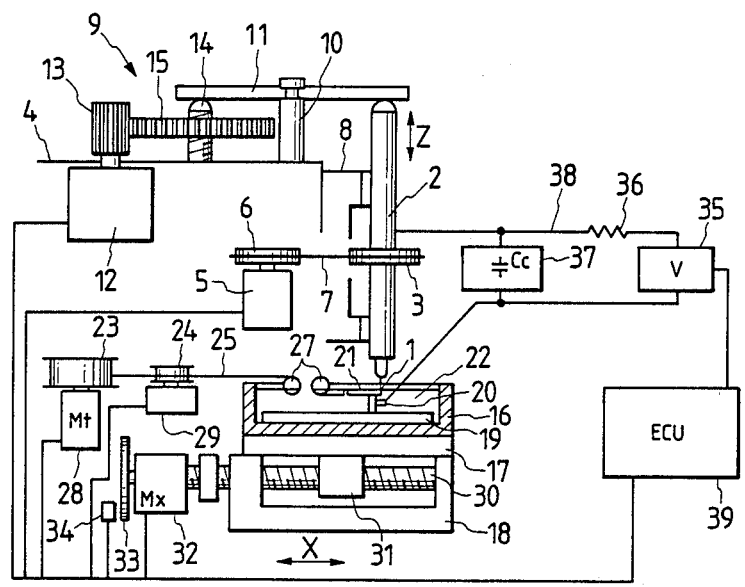

Referring now to FIGS. 1A and 1B, there is schematically illustrated an arrangement of a microshaft electric (electro-) discharge machining apparatus according to a first embodiment of the present invention. In FIGS. 1A and 1B, illustrated by reference numeral 1 is a microshaft (fine shaft) which is held at the pointed end of a mandrel 2. The mandrel 2 has on its circumferential surface a pulley 3 which is coupled through a belt 7 to a pulley 6 attached to a rotatable shaft of a motor 5 supported on a base plate 4. The mandrel 2 is supported through the belt 7 between the pulleys 3 and 6 in a V-shaped groove portion of a bearing 8 which extends vertically, whereby the mandrel 2 is held vertically so as to be rotatable about its own axis and movable in the directions of its axis. The downward movement of the mandrel 2 is made by means of a feed mechanism 9. One example of the feed mechanism 9 is illustrated in FIG. 1B. That is, the feed mechanism 9 includes a lever 11 held on a supporting member 10, installed on the base plate 4, so as to be swingable up and down. One end portion of the lever 11 is arranged to come into contact with the pointed end of a screw 14, the lower portion of which is in turn screwed into a threaded hole defined in the base plate 4 so as to be movable upwardly and downwardly and the other end portion thereof is arranged to come into contact with the top end of the mandrel 2. Furthermore, a toothed wheel 15 is fixedly secured coaxially to the screw 14 and engaged with another toothed wheel 13 which is attached to a rotatable shaft of a motor 12 installed on the base plate 4. Thus, with this arrangement, in response to rotation of the toothed wheel 13 due to drive of the motor 12, the screw 14 and the toothed wheel 15 are rotated together in a predetermined direction (right or left direction) so that the pointed end of the screw 14 pushes up the one end portion of the lever 11, i.e., drops the other end portion thereof, whereby the mandrel 2, together with the microshaft 1, is lowered along the V-shaped groove portion of the bearing 8 against the tension force (force pressing the mandrel 2) of the belt 7. On the other hand, when the motor 12 is driven to be rotated in the reverse direction, the screw 14 is moved downwardly so that the mandrel 2 is moved upwardly along the V-shaped groove portion of the bearing 8 by means of the tension force of the belt 7.

Below the mandrel 2 and the microshaft 1 is placed a machining vessel 16 installed on a table 17 which is in turn supported on a supporting base 18 which may be installed on the base plate 4. On the bottom surface of the machining vessel 16 is placed an insulating plate 19 which has a supporting member 20 protruded vertically from the upper surface thereof. The supporting member 20 supports a conductive wire guiding device 21. The machining vessel 16 is filled with an insulating liquid 22 in which the conductive wire guiding device 21 is submerged. At the outside of the machining vessel 16 is provided a supply bobbin 23 and a take-up bobbin 24 which are placed on the table 17. A conductive wire 25 with an extremely small diameter wound around the supply bobbin 23 passes through a wire guiding device 26, the wire guiding device 21 and a wire guiding device 27 so as to be wound around the take-up bobbin 24. Here, at the wire guiding device 21, the wire 25 is guided so as not to have an obstruction above the wire 25. The supply bobbin 23 is rotated in response to drive of a DC motor 28 installed on the base plate 4 or the like and the take-up bobbin 24 is rotated in response to drive of a motor 29 installed on the base plate 4 or the like. Rotation of the take-up bobbin 24 due to the drive of the motor 29 and rotation of the supply bobbin 23 due to the drive of the DC motor 28 cause the wire 25 to travel by variation of the rotational torque and to be wound by the take-up bobbin 24. At this time, if control is performed so that the current supplied to the DC motor 28 becomes constant, it is possible to move the wire 25 with a constant tension force and at a constant speed.

The supporting base 18 is adapted to rotatably support a screw shaft 30 which is engaged through a ball (not shown) with a nut member 31 attached to the lower surface of the table 17. The screw shaft 30 is connected to a stepping motor 32 so as to be rotatable by the drive of the stepping motor 32. The rotation of the screw shaft 30 causes the nut member 31, table 17, machining vessel 16, bobbins 23, 24 and so on to move to be close to and apart from the microshaft 1. As detection means for positioning the machining vessel 16, i.e., the wire 25, are used a magnetic encoder 33 attached to the output shaft of the stepping motor 32 and a sensor 34 for detecting the rotational position of the magnetic encoder 33. Between the mandrel 2, i.e., the microshaft 1, and the supporting member 20, i.e., the wire 25 are supplied an electric discharge power which is outputted from an electric discharge circuit 38 comprising a power source 35, a resistor 36 and a capacitor 37. The information from the sensor 34 is supplied to an electronic control unit (ECU) 39 which may be constructed of a microcomputer comprising a central processing unit (CPU) and so on. The motors, 5, 12, 28, 29, 32 and the electric discharge circuit 38 are controllable in accordance with command signals from the electronic control unit 39.

Operation of the above-mentioned electric discharge machining apparatus according to the first embodiment will be described hereinbelow with reference to FIGS. 2 and 3, FIG. 2 being an illustration of the relation in position between the microshaft 1 and the wire 25 and FIG. 3 being a flow chart for describing the electric discharge machining processes.

Figure 2:
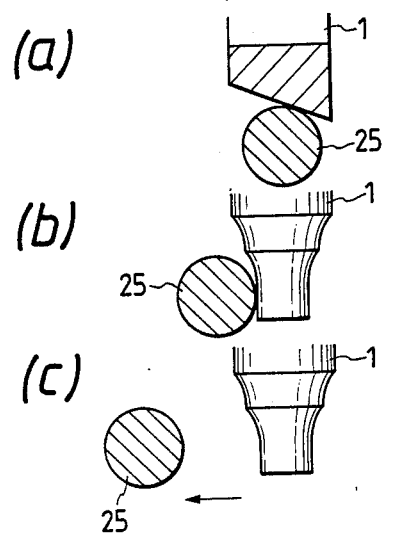
FIGS. 2A, 2B and 2C are illustrations of the relation in positions between a microshaft and a wire.
Figure 3:
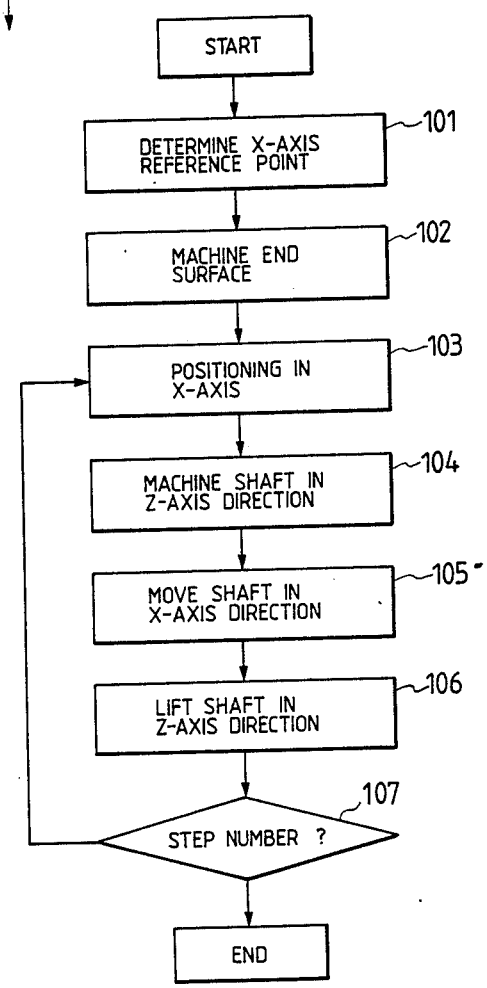
FIG. 3 is a flow chart for describing the electric disgarge machining processes.

As the initial step is determined a reference point of the wire 25 1 in the horizontal directions, i.e., X-axis directions, the reference point in the X-axis directions being a position that the center of cross-section of the wire 25 is coincident with the rotational axis of the microshaft 1, that is, the axis of the wire 25 intersects the axis of the microshaft 1 (step 101 in FIG. 3). The X-axis reference point may be determined on the basis of the position that the wire 25 comes into contact with the microshaft 1 and the diameter of the microshaft 1 and the data representing the X-axis reference point is inputted into the electronic control unit 39. The wire 25 is then moved by means of the motor 32 so as to be positioned below the microshaft 1 as shown by (a) in FIG. 2. Here, because the lower end surface of the microshaft 1 is not flat, i.e., not horizontal, it is necessary to machine the lower portion (indicated by oblique lines in FIG. 2) of the microshaft 1 so as to make flat the lower surface of the microshaft 1. Thus, with the wire 25 taking the X-axis reference point, the electronic control unit 39 outputs a control signal to the electric discharge circuit 38 which in turn supplies an electric discharge power between the microshaft 1 and the wire 25. In this state, the wire 25 is moved by means of the motor 32 and the mandrel 2, i.e., the microshaft 1, is rotated by means of the motor 5 and further moved downwardly by means of the motor 12, whereby the oblique portion of the microshaft 1 is removed (step 102 in FIG. 3). At this time, a reference point in Z-axis directions are determined, the Z-axis reference point being determined as a position that the removing of the oblique portion is completed.

Thereafter, the motor 32 is driven so that the machining vessel 16, wire guiding device 21 and so on are moved horizontally (in X-axis direction) so as to cause the center of the cross-section of the wire 25 to be shifted from the rotational axis of the microshaft 1 and take a desirable position, the position of the wire being detected by means of the magnetic encoder 33 and the sensor 34 (step 103 in FIG. 3). With this state, the electronic control unit 39 outputs a control signal to the electric discharge circuit 38 which in turn supplies an electric discharge power between the circumferential surface of the microshaft 1 and the circumferential surface of the wire 25. Furthermore, the wire 25 is moved by means of the motor 32 and the mandrel 2, i.e., the microshaft 1, is rotated by means of the motor 5 and further moved downwardly by means of the motor 12 as shown by (b) of FIG. 2, so that the diameter of the microshaft 1 is gradually decreased up to a predetermined diameter and the decreased portion thereof has a predetermined length (step 104 in FIG. 3).

If required, after machining the microshaft 1 so as to have the predetermined diameter and the predetermined length, the motor 32 is once driven to cause the wire 25 to quickly move in the X-axis direction so as not to allow the electric discharge therebetween as shown by (c) in FIG. 2 (step 105 in FIG. 3). Thereafter, the wire 25 returns to the previous position and the electric discharge circuit 38 is energized so as to supply the discharge power to between the wire 25 and the microshaft 1 and the motor 12 is rotated in the reverse direction with the mandrel 2 and the microshaft 1 being rotated due to the drive of the motor 5 so that the mandrel 2 and the microshaft 1 are lifted up by means of the tension force of the belt 7. This results in removing the irregularity of the machined surface of the microshaft 1 which is produced during the first machining (step 106 in FIG. 3) and therefore the machined surface of the microshaft becomes smoother.

If the microshaft 1 is machined stepwise to have a plurality of diameters, in FIG. 3, a step 107 follows to check the number of the steps and, if the step number does not reach a predetermined number, the operational flow returns to the step 103 in order to repeatedly perform the above-mentioned machining of the microshaft 1. In this case, the position of the center of cross-section of the wire 25 is stepwise away from the axis of the microshaft 1.

Although in the above-described embodiment the wire 25 is adapted to be moved so as to be close to or away from the microshaft 1 through the screw shaft 30, nut member 31 and machining vessel 16 by means of the motor 32, it is also appropriate that the V-shaped bearing 8 is driven through a screw shaft and a nut member by means of a motor so that the microshaft 1, instead of the wire 25, is moved so as to be close to or away from the wire 25. Furthermore, although in the above-described embodiment the mandrel 2 and the microshaft 1 are moved down by means of the feed mechanism 9, it is also appropriate to move the machining vessel 16, bobbins 23, 24 and so on upwardly.

According to the first embodiment of this invention, since the electric discharge machining of the microshaft 1 is performed by means of the travelling wire 25, it is possible to substantially prevent the wearing of the discharge machining means (wire 25) at the machining point, resulting in the relative position relationship between the wire 25 and the microshaft 1 being accurately coincident with the machining diameter of the microshaft 1. In addition, since the end portion of the microshaft 1 is machined to become flat to set the machining reference point, it is possible to accurately position the wire 25 with respect to the microshaft 1. Furthermore, after machining the microshaft 1 so as to have a desirable diameter and a desirable length, the machined surface thereof is again machined without reducing the diameter thereof in order to remove the irregularity made thereon, and therefore it is possible to make smooth the circumferential surface of the microshaft 1.

As a modification of the above-described embodiment, it is also appropriate that, after machining the microshaft 1 so as to have a desirable diameter and a desirable length, the machined surface thereof is remachined without reducing the diameter with the polarities of the microshaft 1 and the wire 25 being switched to be reverse to each other.

A second embodiment of this invention will be described hereinbelow with reference to FIGS. 4A to 4C, FIG. 4A being a plan view of a microshaft electric discharge machining apparatus according to the second embodiment, FIG. 4B being an elevational view of the electric discharge machining apparatus partially in section, and FIG. 4C being an enlarged view of a portion of the electric discharge machining apparatus indicated by reference character Vc in FIG. 4B. Here, parts corresponding to those in FIGS. 1A and 1B are marked with the same numerals and the description thereof will be omitted for brevity.

Figure 4A:
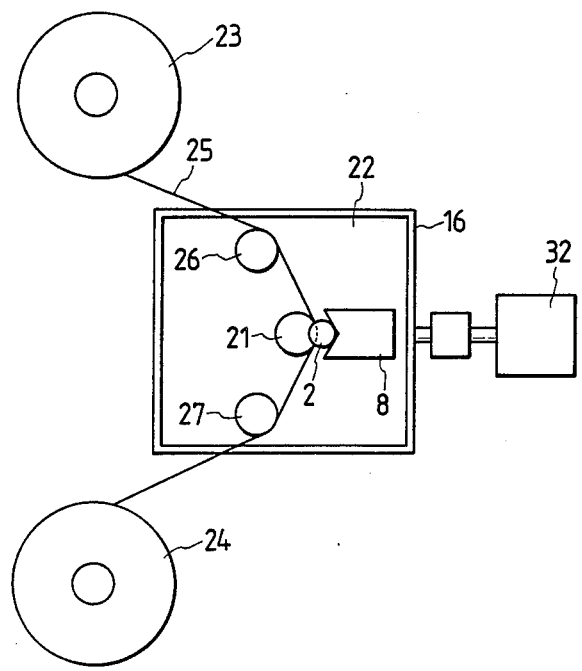
Figure 4B:
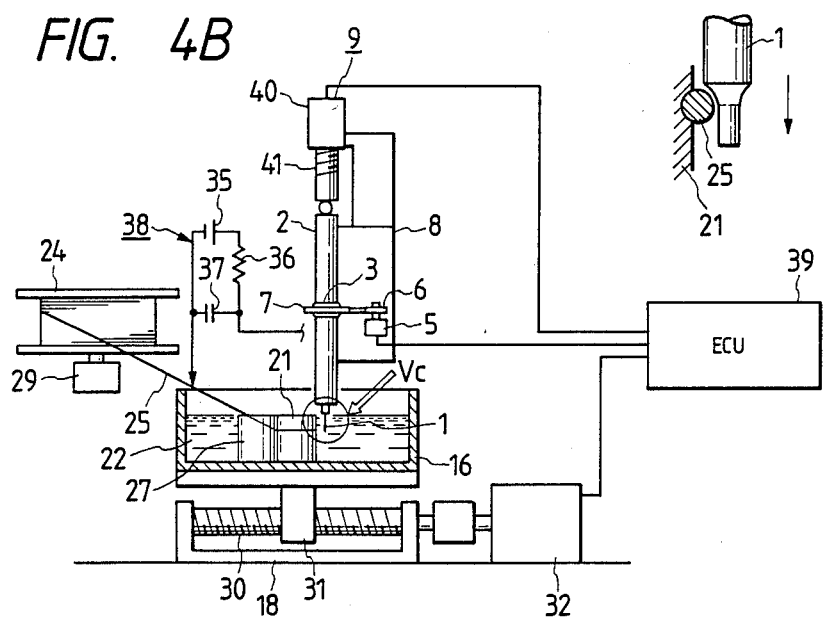
Figure 5:
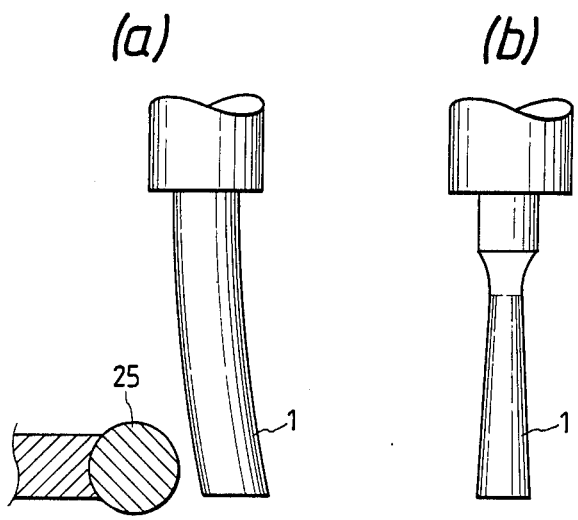
FIGS. 5A and 5B are illustrations for describing the machined states of the microshaft by the wire.

In FIGS. 4A to 4C, the microshaft electric discharge machining apparatus includes a microshaft feed mechanism 9 comprising a motor 40 and a feed screw shaft 41 which may be engaged with a nut member (not shown) attached to the drive shaft of the motor 40 so that the feed screw shaft 41 is moved up and down in response to the drive of the motor 40. For performing the electric discharge machining of a microshaft 1, after removing the lower portion of the microshaft 1 so as to cause the lower surface of the microshaft 1 to become flat as well as in the case of the above-described first embodiment, a motor 32 is driven to move a wire 25 to a predetermined position whereby the microshaft 1 can be machined to a desirable diameter and an electric discharge circuit 38 is energized to supply an electric discharge power between the wire 25 and the microshaft 1. At this time, the wire 25 is made to travel between bobbins 23 and 24 by means of motors 28 and 29 and the microshaft 1 is rotated through a mandrel 2 by means of the motor 5 and moved downwardly through the mandrel 2 by means of the motor 40 at a desirable speed so as to machine the microshaft 1 to a desirable diameter as shown in FIG. 4C. Thereafter, the microshaft 1 is further discharge-finished with it being moved upwardly at a predetermined speed. That is, when the diameter of the microshaft 1 to h=machined is extremely small (for example, about 15 microns), the microshaft 1 is bent during the electric discharge machining as shown by (a) in FIG. 5 and can result in having a tapered configuration as shown by (b) in FIG. 5. The upward movement of the microshaft 1 with the electric discharge being performed therebetween causes correction of the tapered configuration.

According to the second embodiment, as well as in the case of the first embodiment, since the wire 25 travels during the electric discharge machining of the microshaft 1 and the microshaft 1 is adapted to move upwardly at a desirable speed for the electric discharge finish after the first machining, the relation in position between the microshaft 1 and the wire 25 accurately corresponds to the finished diameter of the microshaft 1 and this allows the apparatus to easily machine the microshaft 1 so as to have a desirable diameter and a desirable configuration.

A third embodiment of this invention will be described hereinbelow with reference to FIGS. 6A to 6C, FIG. 6A being a plan view of a microshaft electric discharge machining apparatus of the third embodiment, FIG. 6B being an elevational view of the microshaft electric discharge machining apparatus partially in section, and FIG. 6C being an illustration viewed from the direction indicated by an arrow VIIc in FIG. 6B. Parts corresponding to those in FIGS. 1A and 1B and FIGS. 4A to 4B are marked with the same numerals and the description will be omitted for brevity.

In FIGS. 6A to 6C, in the third embodiment, as positioning means of a wire 25 (or a machining vessel 16) are used a position detecting device 43 provided in conjunction with the machining vessel 16 and a rotational position detecting device 44 provided in connection with the output shaft of a stepping motor 32. The position detecting device 43 comprises a plate 45 with a slit and a photosensor 46 including a light-emitting element and a light-receiving element which are disposed in opposed relation to each other with respect to the plate 45, whereas the rotational position detecting device 44 comprises a disc 47 with a slit 47a, which is formed at an outer portion in a radial direction with respect to the center of the disc 47, and a photosensor 48 including a light-emitting element and a light-receiving element which are disposed in opposed relation to each other with respect to the disc 47.

Figure 7:
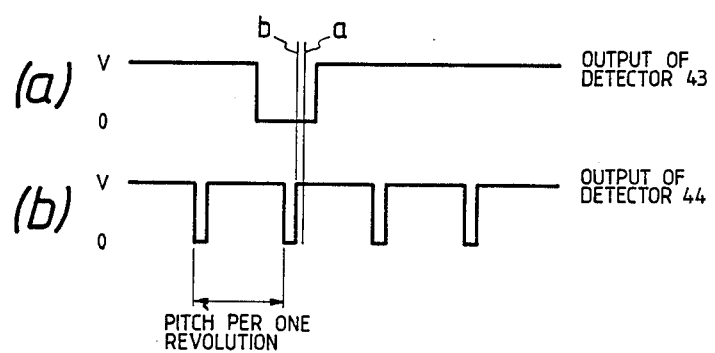
FIG. 7 shows output signals of position detecting devices used in the third embodiment.

For performing the electric discharge machining of a microshaft 1, after machining the lower portion of the microshaft 1 as well as in the case of the first-mentioned embodiment, the motor 32 is driven so that the machining vessel 16, wire guiding devices 21, 26 and 27 so as to carry the wire 25 to a predetermined position. The positioning of the wire 25 is effected on the basis of the output signals of the position detecting device 43 and the rotational position detecting device 44. FIG. 7 shows the signals (a) and (b) outputted from the position detecting device 43 and the rotational position detecting device 44. In FIG. 7, both the detecting devices 43, 44 are adapted to generate predetermined voltage signals v when the light-receiving elements of the photosensors 46, 48 do not receive light through the slits of the plate 45 and disc 47 from the light-emitting elements thereof and generate zero-voltage signals 0 in response to receiving light through the slits thereof. With this arrangement, a reference point of the machining vessel 16, i.e., wire 25, on the positioning control is determined on the basis of the falling time or rising time of the output pulse signal of the rotational position detecting device 44 with the output signal of the position detecting device 43 being zero. On actually determining the reference point of the wire 25, a pulse drive signal is supplied to the stepping motor 32 so that the stepping motor 32 is rotated in one direction and the supply of the pulse signal to the stepping motor 32 is once stopped in the state that the output signal of the position detecting device 43 becomes zero and the output signal of the rotational position detecting device 44 assumes v immediately after zero, that is, when the machining vessel 16 takes a position indicated by reference character a in FIG. 7. Thereafter, the stepping motor 32 is rotated in the reverse direction and the determination of the reference point is made in response to reaching the pulse falling point, i.e., the position indicated by reference character b in FIG. 7. Here, the rotation of the stepping motor to the position a is made for the purpose of removing the mechanical backlash of a screw shaft 30, numt member 31 and so on. This arrangement allows an extremely high accuracy on the positioning control (for example, ±0.0318 microns). After the determination of the reference point, an electric control unit (not shown) supplies a pulse signal corresponding to the distance from the reference point to a desirable position of the wire 25 and, in response to reaching the desirable position, supplies an electric discharge power through an electric discharge circuit 38 to between the wire 25 and the microshaft 1. At this time, the wire 25 runs by means of motors 28, 29 and the microshaft 1 is dropped downwardly by means of a motor 40 and rotated by means of a motor 5.

Figure 8A:
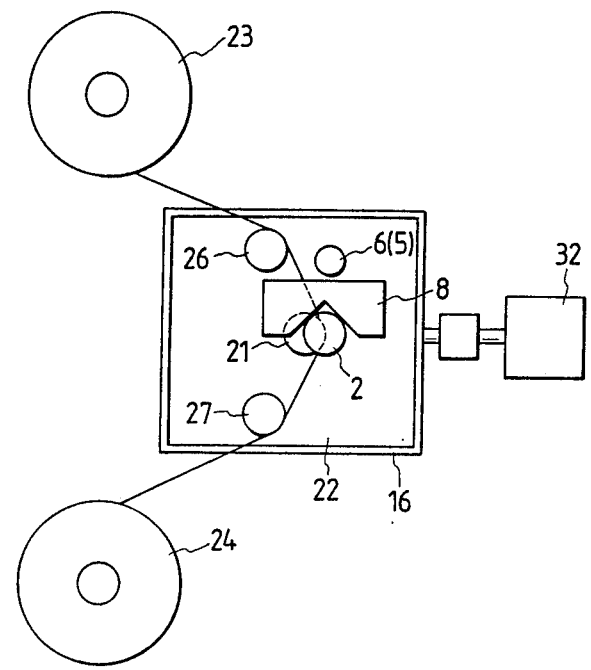
FIGS. 8A and 8B show a fourth embodiment of this invention, FIG. 8A being a plan view of a microshaft electric discharge machining apparatus according to the fourth embodiment and FIG. 8B being an elevational view of the microshaft electric discharge machining apparatus partially in section.
Figure 8B:
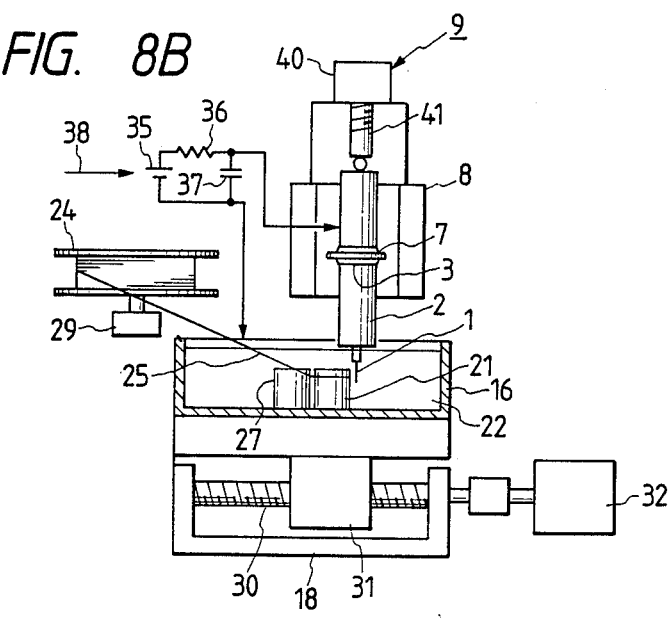
Figure 9A:
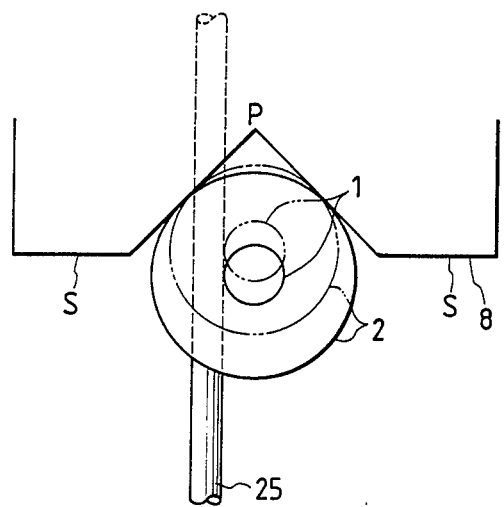
FIGS. 9A and 9B are enlarged views showing the relation in position between a V-shaped bearing and a wire of the microshaft electric discharge machining apparatus of the fourth embodiment.
Figure 9B:
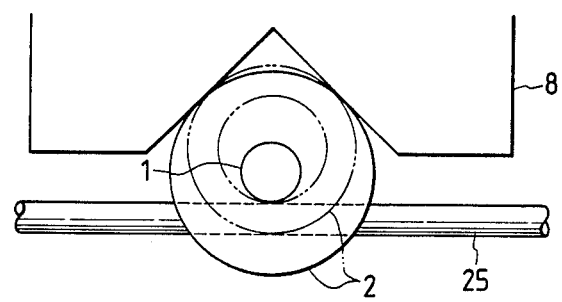

A fourth embodiment of this invention will be described hereinbelow with reference to FIGS. 8A, 8B and 9A, 9B, FIG. 8A having a plan view of a microshaft electric discharge machining apparatus according to the fourth embodiment, FIG. 8B being an elevational view of the microshaft electric discharge machining apparatus partially in section, and FIGS. 9A and 9B being enlarged views showing the relation in position between a V-shaped bearing 8 and a wire 25 of the microshaft electric discharge machining apparatus. Parts corresponding to those in the drawings used for describing the above-mentioned embodiments are marked with the same numerals and the description will be omitted for brevity. One important feature of the microshaft electric discharge machining apparatus according to the fourth embodiment is that the wire 25 is arranged at the machining position to be guided in parallel to the bisector of the cross-section of the V-shaped groove thereof as more clearly illustrated in FIG. 9A, the cross-section being a triangular configuration spread from the bottom of the V-shaped groove toward the front surface s of the bearing 8 and the bisector passing through a point p corresponding to the bottom thereof. In other words, the wire 25 is guided at the machining position in parallel to a line which is normal to the bottom line of the V-shaped groove thereof and which divides the spread angle of the V-shaped groove into two equal angles. In this case, a machining vessel 16, wire guiding devices 21, 26, 27 and so on are arranged as shown in FIG. 8A or 8B so as to be movable in the directions normal to the bisector of the V-shaped groove cross-section with respect to the microshaft 1. Here, the radius of curvature of the wire guiding device 21 is very much greater as compared with the radius of the mandrel 2 and therefore the wire 25 extends to be substantially parallel to the bisector of the V-shaped groove cross-section at the machining section. That is, variation of the diameter of the mandrel 2 due to the exchanging, for example, generally causes variation of the position of the microshaft 1 with respect to the bearing 8. Therefore, in the case that the wire 25 is guided in the directions of the bisector of the V-shaped groove cross-section when machining the microshaft 1 as shown in FIG. 9B, the variation of diameter of the mandrel 2 affects the machining accuracy of the microshaft 1. For example, when the diameter of the mandrel 2 is changed from 5 millimeters to 5.001 millimeters, the diameter of the microshaft 1 is reduced by 2.82 microns. On the other hand, in the case that the wire 25 is moved in the directions perpendicular to the bisector thereof for machining the microshaft 1 with the wire 25 running to be parallel to the bisector thereof as shown in FIG. 9A, the variation of the diameter thereof does not affect the machining accuracy of the microshaft 1 because the position of the microshaft 1 is varied along the bisector thereof in accordance with the variation of the diameter thereof.

A fifth embodiment of this invention will be described hereinbelow with reference FIGS. 10A and 10B, FIG. 10A being a plan view showing a microshaft electric discharge machining apparatus of the fifth embodiment and FIG. 10B being a side view of the microshaft electric discharge machining apparatus. Parts corresponding to those in the Figures used for describing the first through fourth embodiments are marked with the same numerals and the description will be omitted for brevity. In FIGS. 10A and 10B, a wire 25 is wound around a supply bobbin 23 which is driven by means of a DC motor 28 so that the rotational torque is applied in the direction indicated by an arrow A in FIG. 10A. The wire 25 from the supply bobbin 23 is guided by fixed wire guiding devices 26, a movable wire guiding device 52 and fixed wire guiding devices 21, 27 and reaches a take-up bobbin 29 which is in turn driven by means of a motor 29 so that the rotational torque is applied in the direction indicated by an arrow B in FIG. 10A. The movable wire guiding device 52 and the fixed wire guiding devices 26, 21, 27 are disposed in a machining vessel 16 with which an insulating liquid for the electric discharge machining is filled. The movable wire guiding device 52 is biased by means of a tension spring 53 in the direction away from the two fixed wire guiding devices 26, i.e., the direction indicated by an arrow C in FIG. 10A, so as to be tightened and linearly movable against the biasing force of the tension spring 53 so as to be closed to the two fixed wire guiding devices 26. The moved position of the movable wire guiding device 52 is detected by a potentiometer 54, the output signal of which is supplied to an electronic control unit 39 which in turn control the current to be applied to the DC motor 28 on the basis of the position information from the pointiometer 54.

For improving the accuracy of the electric discharge machining, it is important to make stable the travelling of the wire 25 between the supply bobbin 23 and the take-up bobbin 24. In this embodiment, the travelling of the wire 25 is made by the difference between the rotational torques of the supply bobbin 23 and the take-up bobbin 24, and therefore the tension force of the wire 25 can be adjusted by changing the rotational torques thereof. For example, in the case that the rotational torque of the supply bobbin 23 is increased by one cause and hence the tension force of the wire 25 is increased, the movable wire guiding device 52 is moved in the direction opposite to the direction indicated by the arrow C. At this time, the movement of the movable wire guiding device 52 is detected by the potentiometer 54 and the electronic control unit 39 decreases the application current to the DC motor 28 so that the rotational torque of the supply bobbin 23 is decreased to adjust the tension force of the wire 25. On the other hand, in the case that the supply bobbin 23 is rotated in the direction opposite to the direction indicated by the arrow A by one cause and the tension force of the wire 25 is lost, the movable wire guiding device 52 is moved in the direction of the arrow C. Similarly, the movement of the movable wire guiding device 52 is detected by the potentiometer 54 and the electronic control unit 39, on the basis of the detection signal therefrom, increases the application current to the DC motor 28 so as to increase the rotational torque of the supply bobbin 23. This arrangement allows making constant the tension force of the wire 25 and further prevents disengagement of the wire 25 with the wire guiding devices and damage of the wire 25 due to an excessive tension. The control of the rotational torque of the supply bobbin 23 may be effected quickly in order to prevent the influence on the machining accuracy.

Figure 11:
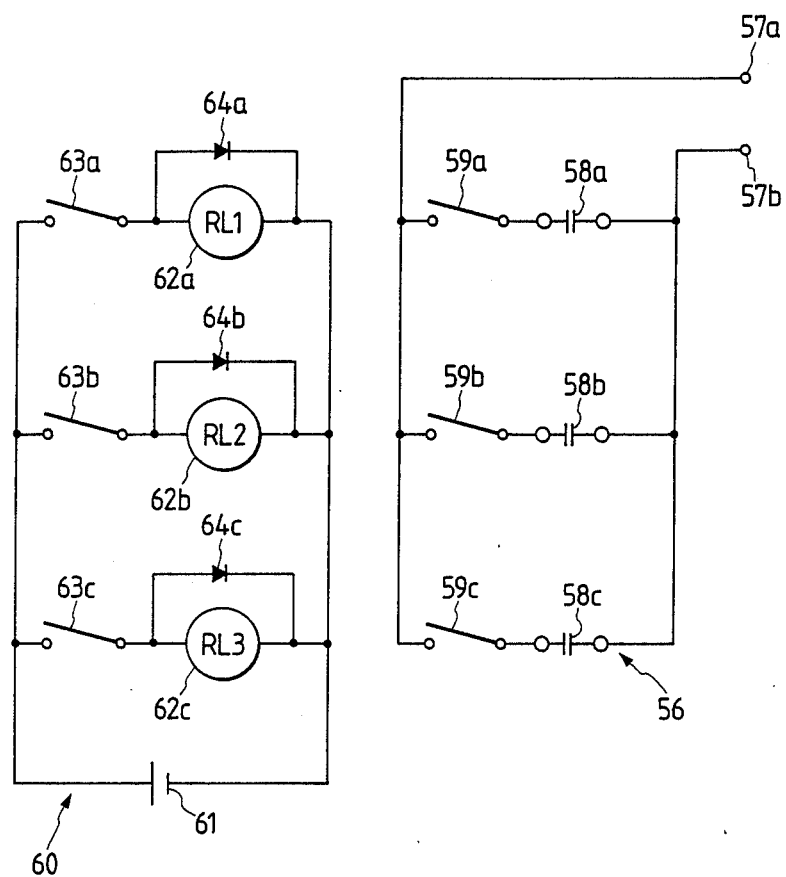
FIG. 11 is a circuit diagram showing an arrangement of an electric discharge circuit of a microshaft electric discharge machining apparatus according to a sixth embodiment of this invention.

A sixth embodiment of this invention will be described hereinbelow with reference to FIG. 11 which shows an electric discharge circuit of a microshaft electric discharge machining apparatus of the sixth embodiment whose basic arrangement is similar to that of the above-mentioned embodiment, the illustration of the parts other than the electric discharge circuit being omitted. In FIG. 11, illustrated by numeral 56 is a terminal device, and first to third capacitors 58a, 58b, 58c with different capacities are coupled in parallel to each other between terminals 57a and 57b and coupled to contacts 59a, 59b, 59c of mercury contact type relays 62a, 62b, 62c (RL1 to RL3). Here, the capacitor 58a with smaller capacity (for example, about 5 to 50pF) may be disposed at a position closer to the terminals 57a and 57b because the floating capacity is varied in accordance with the wiring length. Illustrated by numeral 60 is a relay drive circuit comprising a power source 61, the first to third mercury contact type relays 62a to 62c coupled to the power source 61, first to third change-over switches 63a to 63c respectively coupled in series to the first to third mercury contact type relays 62a to 62c, and diodes 64a to 64c for removing the noises due to opening and closing of the first to third change-over switches 63a to 63c to protect the first to third mercury contact type relays 62a to 62c.

For microscopically performing the electric discharge, it is required to make the discharge energy small by a single pulse, and the discharge energy of the capacitor circuit is proportional to the capacitor capacity and further proportional to the square of the voltage. In the case that the electric discharge machining is performed below 100 microns in diameter, the capacitor capacity is required to be set to about 5 to 50 pF and the floating capacity should be set to an extremely small value. Furthermore, since the machining speed and the machining surface smoothness depend upon the discharge energy and therefore the machining condition is required to be determined on the basis of the machined diameter and surface smoothness. For example, in the case of obtaining a microshaft with a diameter of 15 microns from an untreated member with a diameter of 125 microns, it is desirable that the untreated wire is machined to 30 microns in diameter with a capacitor capacity of 3300pF and a voltage of 100V and then the finish machining is performed with a capacity of about 50pF and a voltage of 100V. If the untreated wire is machined up to 15 microns in diameter with a capacity of 3300pF, the finished surface becomes rough and the formed microshaft tends to become tapered. On the other hand, in the case that the untreated wire with a diameter of 125 microns is machined up to 15 microns with a capacity of about 50pF, because the discharge energy is small, the machining speed is low, thereby resulting in taking a long time for the machining and in deterioration of the configuration accuracy of the microshaft because of frequent generation of short. Thus, it is required to form the microshaft under a plurality of conditions. In this embodiment, one of the change-over switches 63a to 63c is closed so as to operate one relay 62a, 62b or 62c to selectively couple a desirable capacitor 58a, 58b or 58c between the terminals 57a and 57b. This switching of the capacitor allows to accurately perform the electric discharge machining. The floating capacity can be very much decreased at the contacts 59a to 59c by performing the switching between the capacitors 59a to 59c. Furthermore, the capacitor 58a with a smaller capacitor is disposed at a position closer to the terminals 57a and 57b so as to shorten the wire length to reduce the influence of the floating capacity. In the above-mentioned electric discharge circuit arrangement, It is also appropriate to use non-contact type change-over switches instead of the illustrated contact type change-over switches 63a to 63c.

It should be understood that the foregoing relates to only preferred embodiments of the present invention, and that it is intended to cover all changes and modifications of the embodiment of this invention herein used for the purposes of the disclosure, which do not constitute departures from the spirit and scope of the invention.

What is claimed is:

1. An electric discharge machining method of machining a microshaft by means of electric discharge made between said microshaft and a conductive wire through an electric discharge circuit, said microshaft being vertically supported by supporting means to be rotatable about its own axis and movable up and down in directions of the axis by means of microshaft driving means and said wire being arranged to travel in a direction of its own axis and to be movable in directions close to and away from said microshaft by means of wire driving means, whereby said wire is relatively movable with respect to said microshaft in horizontal and vertical directions, comprising the steps of:
   (a) determining a first reference point in the horizontal direction that the axis of said wire intersects the axis of said microshaft;
   (b) driving said wire driving means so that said wire travels in the direction of its own axis;
   (c) rotating said microshaft and machining the lower end surface of said microshaft by said wire so that the lower end surface thereof becomes perpendicular to the axis thereof to determine a second reference point in the vertical direction on the basis of the position of the machined end surface thereof;
   (d) shifting said wire up to a predetermined position away from said first reference point in the horizontal direction by a first predetermined distance; and (e) moving said microshaft with respect to said wire in the vertical directions by a second predetermined distance between said second reference point and a predetermined point with said microshaft being rotated and said wire travelling so that said microshaft is machined to have a diameter substantially equal to twice said first predetermined distance and the machined portion of said microshaft has a length corresponding to said second predetermined distance.

2. An electric discharge machining method as claimed in claim 1, further comprising a step of quickly separating said wire from said microshaft in the horizontal direction after the termination of the machining of said microshaft.

3. An electric discharge machining method as claimed in claim 1, further comprising a step of further moving said microshaft with respect to said wire in the vertical directions without reducing the diameter of said machined portion of said microshaft with the electric discharge being made between said wire and said microshaft after the termination of the machining of said microshaft.

4. An electric discharge machining method as claimed in claim 1, further comprising a step of further moving said microshaft with respect to said wire in the vertical directions without reducing the diameter of said machined portion of said microshaft with the polarities of said microshaft and said wire being switched to be reverse each other and the electric discharge being made between said wire and said microshaft after the termination of the machining of said microshaft.

5. An electric discharge machining method as claimed in claim 1, wherein the step, (b) comprising a step of causing said wire to travel at substantially right angles to the axis of said microshaft.

6. An electric discharge machining method as claimed in claim 5, wherein said supporting means includes bearing means with a vertically formed V-shaped groove and said microshaft is held by a mandrel so as to be coaxial therewith, said mandrel being engaged with said V-shaped groove thereof so that said microshaft is vertically supported, and said wire travelling in parallel to the bisector of the triangular cross section of said V-shaped groove thereof, said bisector passing through one of three points of the triangular cross section corresponding to the bottom of said V-shaped groove.

7. An electric discharge machining apparatus for machining a microshaft by means of electric discharge, comprising:
   mandrel means for holding said microshaft;
   bearing means for supporting said mandrel;
   first drive means for rotating said mandrel means so that said microshaft is rotated about its own axis;
   second drive means for moving said mandrel and said microshaft so that said microshaft is relatively movable in directions of its own axis with respect to a conductive wire used as means for machining said microshaft;
   third drive means for moving said wire in a direction of its own axis at a machining position with said wire being guided by wire guiding means;
   fourth drive means for moving said wire so as to be closed and separated to and from said microshaft;
   electric discharge circuit means for generating electric discharge between said microshaft and said wire; and
   control means for controlling said first to fourth drive means and said electric discharge circuit means so that said wire is moved by said fourth drive means so as to be separated by a first predetermined distance from the axis of said microshaft, said microshaft is rotated by said first drive means, said wire is moved in the direction of its own axis by said third drive means, the electric discharge is made by electric discharge circuit means between said wire and said microshaft, and said microshaft is moved by said second drive means by a second predetermined distance in the direction of its own axis, whereby said microshaft is machined so as to have a predetermined diameter corresponding to said first predetermined distance and the machined portion of said microshaft has a length corresponding to said second predetermined length, and after the termination of the electric discharge machining of said microshaft, said control means controls said electric discharge circuit means so that the polarities for said wire and said microshaft are switched to be reversed and further controls said second drive means so that said microshaft is moved in the direction opposite to the direction in which said microshaft has been machined by the electric discharge.

8. An electric discharge machining apparatus as claimed in claim 7, wherein said mandrel holds said microshaft so as to be coaxial therewith and said bearing means has a V-shaped groove formed vertically, said mandrel being supported by said V-shaped groove of said bearing means so that said microshaft is kept vertical.

9. An electric discharge machining apparatus as claimed in claim 7, wherein said wire guiding means is placed on table means and said fourth drive means comprises a screw shaft, nut member engaged with said screw shaft, and stepping motor means coupled to said screw shaft to move said nut member along said screw shaft, said nut member being connected to said table means so that said wire is movable with respect to said microshaft.

10. An electric discharge machining apparatus as claimed in claim 7, wherein said control means controls said fourth drive means to separate said wire from said microshaft after the termination of the electric discharge machining of said microshaft.

11. An electric discharge machining apparatus as claimed in claim 7, wherein said electric discharge circuit means comprises a power source, capacitors with different capacities which are coupled to said power source and connected in parallel to each other, and switching means for selectively using one of said capacitors on the electric discharge between said wire and microshaft.

12. An electric discharge machining apparatus as claimed in claim 7, wherein said control means controls the speed at which said microshaft is moved by said second drive means.

13. An electric discharge machining apparatus as claimed in claim 7, wherein said control means controls the speed at which said microshaft is moved by said second drive means in the direction opposite to the machined direction.

14. An electric discharge machining apparatus as claimed in claim 9, further comprising position detecting means provided in conjunction with said stepping motor and said table means for detecting a rotational position of said stepping motor and a moved position of said table means, and wherein said control means performs the relative positioning between said wire and said microshaft.

15. An electric discharge machining apparatus as claimed in claim 7, wherein said wire guiding means is arranged so that said wire travels in parallel to a bisector of the triangular cross section of said V-shaped groove of said bearing means, said bisector passing through one of three points of the triangular cross section corresponding to the bottom of said V-shaped groove thereof.

16. An electric discharge machining apparatus as claimed in claim 7, wherein said third drive means comprises a supply bobbin around which said wire is wound and a take-up bobbin for winding said wire supplied through said wire guiding means from said supply bobbin, said supply bobbin being driven in one direction by a first motor and said take-up bobbin being driven in a direction opposite to the driving direction of said supply bobbin by a second motor, the rotational torque of said take-up bobbin being greater than that of said supply bobbin and said wire being wound around said take-up bobbin by the difference between the rotational torques of said supply bobbin and said take-up bobbin.

17. An electric discharge machining apparatus as claimed in claim 7, wherein said wire guiding means includes a movable guide which is biased by spring means in one direction to be movable so as to provide a tension force to said wire between said supply bobbin and said take-up bobbin and which is movable against the biasing force of said spring means in a direction opposite to the biasing direction of said spring means so as to reduce the tension force of said wire therebetween.

18. An electric discharge machining apparatus as claimed in claim 7, further comprising position detecting means for detecting a position of said movable guide, and wherein said control means controls current applied to said first motor in accordance with the position of said movable guide detected by said position detecting means so that the tension force of said wire between said supply bobbin and said take-up bobbin is adjusted.

* * * * *